(12) United States Patent
Zhang et al.

(10) Patent No.: US 9,712,696 B1
(45) Date of Patent: Jul. 18, 2017

(54) SYSTEM AND METHOD OF ON-SCREEN MANAGEMENT OF SCANNED DOCUMENTS (71) Applicants: Kabushiki Kaisha Toshiba, Minato-ku (JP); Toshiba TEC Kabushiki Kaisha, Shinagawa-ku (JP)

(72) Inventors: Jia Zhang, Irvine, CA (US); Michael L. Yeung, Mission Viejo, CA (US); William Su, Riverside, CA (US)

(73) Assignees: Kabushiki Kaisha Toshiba, Minato-ku (JP); Toshiba TEC Kabushiki Kaisha, Shinagawa-ku (JP)

( * ) Notice: Subject to any disclaimer, the term of this patent is extended or adjusted under 35 U.S.C. 154(b) by 0 days.

(21) Appl. No.: 14/981,308

(22) Filed: Dec. 28, 2015

(51) Int. Cl.
*G06F 3/12* (2006.01)
*H04N 1/00* (2006.01)

(52) U.S. Cl.
CPC ....... *H04N 1/00411* (2013.01); *H04N 1/0044* (2013.01); *H04N 1/00413* (2013.01); *H04N 1/00461* (2013.01); *H04N 1/00469* (2013.01); *H04N 2201/0094* (2013.01)

(58) Field of Classification Search
CPC .......... H04N 1/00411; H04N 1/00413; H04N 1/0044; H04N 1/00469; H04N 1/00461
See application file for complete search history.

*Primary Examiner* — Marivelisse Santiago Cordero
*Assistant Examiner* — Neil R McLean
(74) *Attorney, Agent, or Firm* — Ulmer & Berne LLP (57) ABSTRACT

An on-screen document management system and method includes a document processing device configured to receive touch commands on a touch capable display screen from a user. The user can select one or more portions of an existing document and place the desired selections into a new document. The portions can be resized and placed in the new document in accordance with the desires of the user. The new document is rendered with the selected portion or portions, and then displayed on the display screen as the new document would be output. The new document can be output using a document processing operation such as printing, faxing, emailing, or storing to an external server.

19 Claims, 7 Drawing Sheets

SYSTEM AND METHOD OF ON-SCREEN MANAGEMENT OF SCANNED DOCUMENTS

TECHNICAL FIELD

The subject application teaches embodiments that relate generally to on-screen management of documents received on a multifunction device and specifically to on-screen editing of documents scanned on a multifunction printer.

SUMMARY

In an example embodiment, a document processing device receives user commands to create a new document, define a frame in the new document, and select a portion of an existing document that is placed into the frame in the new document. The new document can be output via a document processing operation such as printing, faxing, emailing, or storing to an external server. The new document can be rendered and displayed on a display of the document processing device. The rendering can be performed by the document processing device or an image processing server. The display can include touch capability and the user commands can be performed through touch operations such as selecting, resizing, dragging and dropping. The new document can include selected portions from one or multiple existing documents.

In an example embodiment, a method includes selecting, on a display screen of a document processing device, a portion of an existing document and positioning the selected portion in a new document. The method includes rendering an image of the new document that includes the selected portion and displaying the rendered image on the display screen. The method includes outputting the new document via a document processing operation. Document processing operations can include printing, faxing, emailing, or storing to an external server. The existing document can be received via a document processing operation such a scanning, receiving via email, receiving via fax, and retrieving from an external server. Rendering can be performed by the document processing system or an image processing server. The method can include defining a user-selectable frame in the new document and resizing the selected portion to fit the user-selectable frame. The method can include selecting a second portion from the existing document, or selecting a portion from a second existing document, and positioning the selected portion into the new document. The operations can be performed through touch operations of a user's fingers on a touch capable display of the document processing system.

In an example embodiment, a multifunction document processing device includes an embedded controller and a touch capable display that is in communication with the touch capable display. The multifunction document processing device is configured to receive a touch command for selecting a portion of an existing document that is dragged to a new document. The new document is rendered and displayed on the touch capable display. The new document is output using a document processing operation. Suitable document processing operations include but are not limited to printing, faxing, emailing, and storing to an external server. The rendering can be performed by the multifunction document processing device or an image processing server. The multifunction document processing device can be configured to receive a touch command to defined a user-selectable frame in the new document, and the selected portion that is dragged to the new document can be resized to fit the user-selectable frame. Touch commands from a user can perform additional on-screen document management functions, including but not limited to resizing a portion of an existing document and generating a new document from the resized portion, redacting one or more portions of an existing document and generating a new document without the redacted portions, splitting a portion of an existing document into multiple pages of a new document, and merging a plurality of portions of one or more existing documents into a new document.

BACKGROUND

Document processing devices are in widespread use in many businesses and academic settings. Such devices include copiers, scanners, printers and facsimile machines. Today, one or more functions associated with such devices are combined in a single unit, referred to as a multifunction peripheral ("MFP") or multifunction device ("MFD"). MFPs are typically network connected to allow users to print remotely from their computers, scan documents that can be sent to a user's computer or a third party's computer (for example via email), copy documents, or fax documents to other people.

In some instances, a user scans one or more documents but the scanned documents are not in the desired final form. For example, a user may scan a single document having multiple pages, but may desire to break that single document into multiple different documents. The user also may desire to send only a subset of the scanned pages to a particular recipient. The user also may desire to send only a portion of a scanned page, or redact portions of one or more scanned pages. In these examples, the user generally forwards the scanned document to the user's workstation, performs document editing such as splitting the document into one or more new documents, and forwards the edited document from the user's workstation. In another example, a user may need to resize a scanned page before reprinting it, for example to enlarge fonts for readability or to shrink multiple pages so that they can be combined onto a single page. In this example, the user might use trial and error to find the desired size, potentially wasting resources and generating multiple unnecessary print outs.

DETAILED DESCRIPTION

The systems and methods disclosed herein are described in detail by way of examples and with reference to the figures. It will be appreciated that modifications to disclosed and described examples, arrangements, configurations, components, elements, apparatuses, devices methods, systems, etc. can suitably be made and may be desired for a specific application. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such.

The systems and methods disclosed herein describe an on-screen document management system for a document processing device. Suitable document processing devices include scanners, copiers, printers, plotters and fax machines. Two or more of these functions can be contained in a single device or unit, referred to as a multifunction peripheral ("MFP") or multifunction device ("MFD"), which may also serve as an e-mail or other information routing gateway. As used herein, MFP includes any device having one or more document processing functions such as those noted above. While example embodiments described herein refer to MFPs, it will be appreciated that they may be also applied to single use devices, such as a printer. The on-screen document management system allows user to resize documents, split documents, redact documents, and merge documents on-screen at the MFP. Advantageously, this reduces the labor and costs by eliminating the need for users to first forward documents to a workstation for editing prior to printing or forwarding the modified document.

Figure 1:
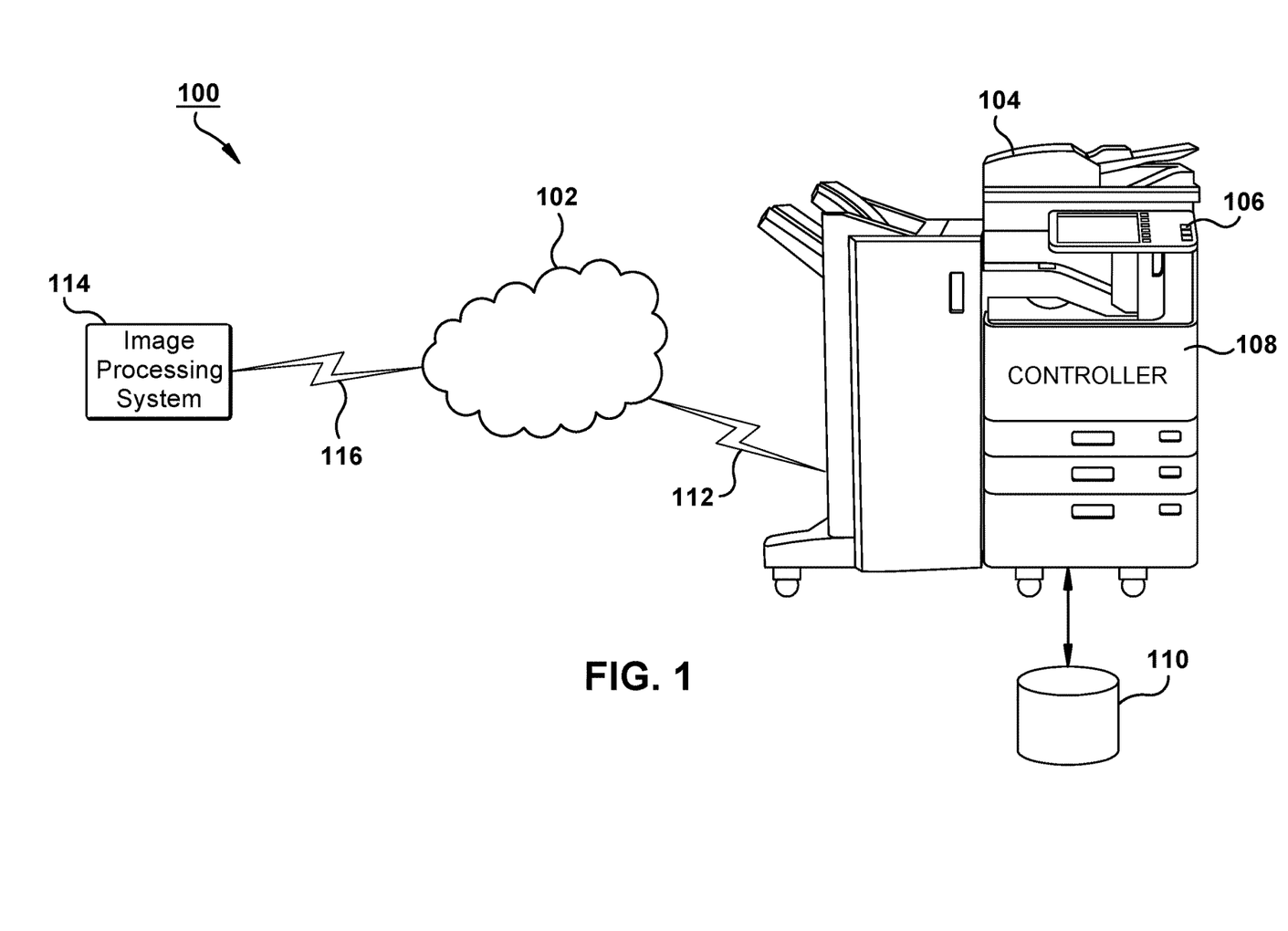
FIG. 1 is a diagram of an on-screen document management system included in a multifunction peripheral according to an embodiment of the disclosure.

Turning to FIG. 1, a document processing system 100 is presented. The document processing system 100 includes a network 102 that is in data communication with one or more document processing devices, suitably comprised of an MFP 104 as illustrated. MFP 104 is suitably operable for printing, faxing, scanning, copying, e-mailing, or any other document processing operation will be understood by one of ordinary skill in the art. In the illustrated embodiment, MFP 104 includes a user interface 106 as will be detailed further below. Operation of the MFP 104 is suitably managed by an embedded controller 108 and embedded data storage 110 as will be detailed further below.

In the example embodiment of FIG. 1, MFP 104 is coupled for data communication 112 with network 102, suitably comprised of a local area network (LAN), a remote local area network (RLAN), a wide area network (WAN) which may comprise the Internet, or any combination thereof. In the embodiment of FIG. 1, one or more MFPs 104 can be in data communication with an image processing server 114 that renders images suitable for previewing on-screen document managing functions as described in detail below.

Figure 2:
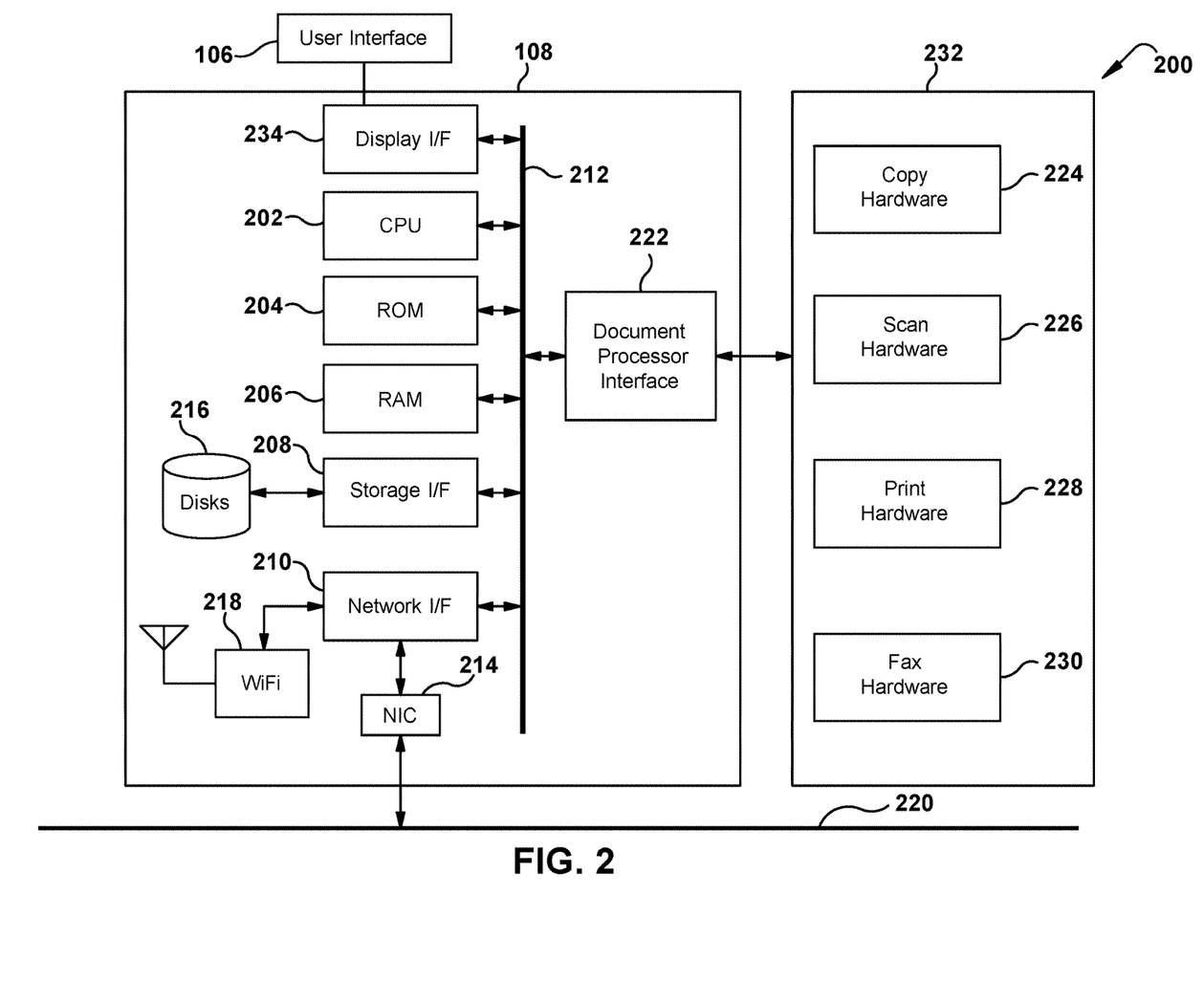
FIG. 2 is a block diagram of components of a multifunction peripheral according to an embodiment of the disclosure.

Turning now to FIG. 2, presented are functional components 200 suitably comprising a multifunctional peripheral such as MFP 104 of FIG. 1. Included is an example embodiment of controller 108 which is suitably comprised of a computer. Included in example controller 108 are one or more processors, such as illustrated by central processor unit (CPU) 202. Also included are non-volatile memory, such as read-only memory (ROM) 204, random access memory (RAM) 206, a storage interface 208, a network interface 210, and touchscreen display interface 234. In the example embodiment, CPU 202, ROM 204, RAM 206, storage interface 208, network interface 210, and touchscreen display interface 234 are in mutual data communication via bus 212. Storage interface 208 facilitates data access with bulk data storage, such as one or more disks 216, or any other suitable data storage such as a flash drive, solid state storage drive, CD, DVD or the like. Network interface 210 suitably provides for external data communication, such as with a network interface connection (NIC) 214 or WiFi interface 218. NIC 214 or WiFi interface 218 suitably provide for connection to an associated network 220.

In the example embodiment of FIG. 2, touchscreen display interface 234 suitably provides support for the user interface 106 and can include support for a display screen, touchscreen inputs, key inputs such as keypad or keyboard inputs, audible outputs such as a speaker, and so forth. Touchscreen display interface 234 can support standardized inputs and outputs, such as VGA, HDMI, USB, and serial interfaces, or can be configured to support proprietary cabling and/or proprietary interfaces.

In the example embodiment of FIG. 2, a document processor interface 222 is also in data communication with bus 212, and provides a gateway to copy hardware 224, scan hardware 226, print hardware 228 and fax hardware 230 which together comprise MFP functional hardware 232.

Figure 3:
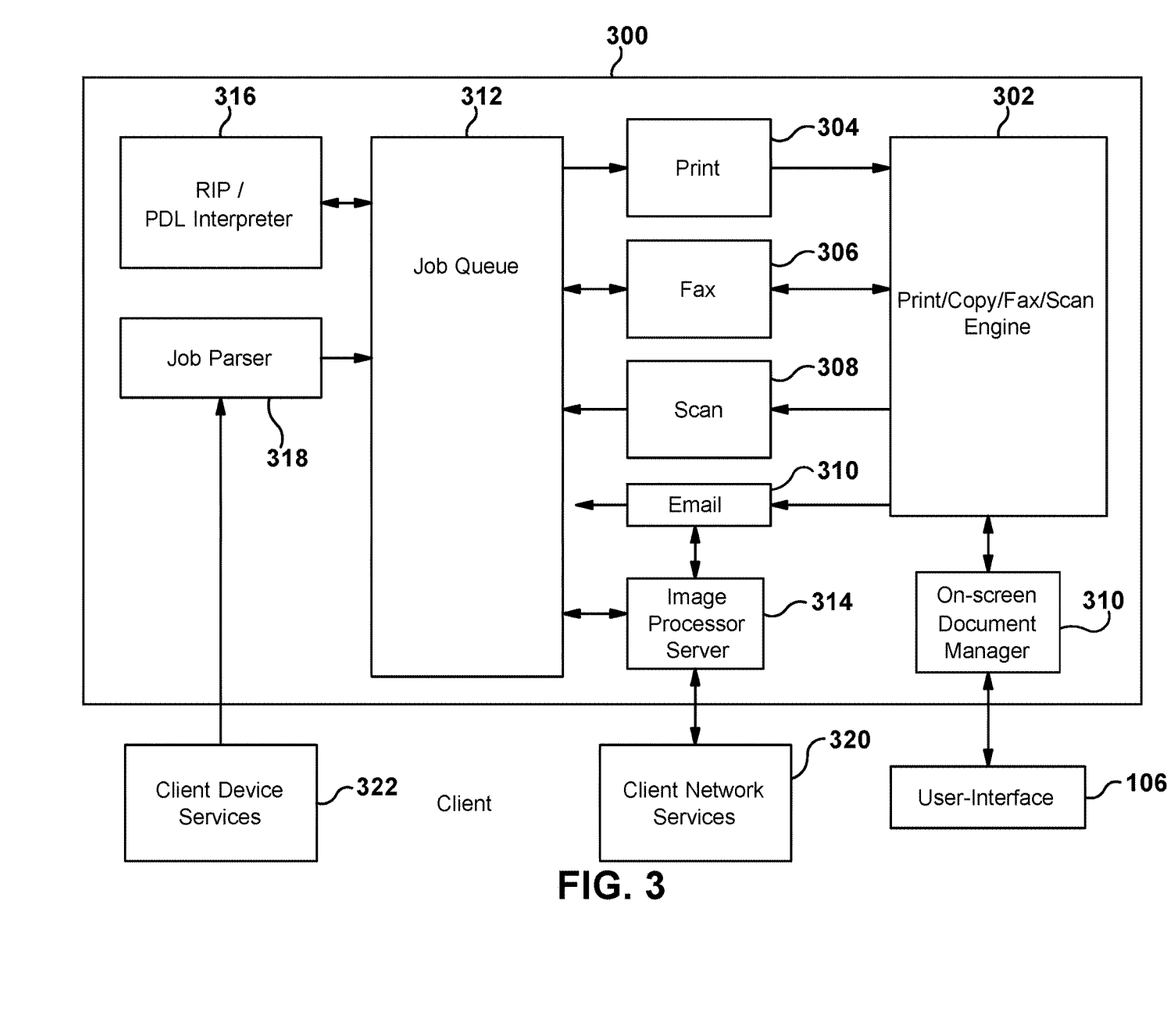
FIG. 3 is a block diagram of functional components of a multifunction peripheral that includes an on-screen document management function according to an embodiment of the disclosure.

Turning now to FIG. 3, illustrated is a functional block diagram 300 of an example MFP. Included is a print/copy/fax/scan engine 302 which interfaces with print control 304, fax control 306, and scan control 308, all of which are suitably interfaced with job queue 312. Print/copy/fax/scan engine 302 is suitably interfaced with on-screen document manager 310. On-screen document manager 310 is in communication with image processing server 114 via network services 314. Print/copy/fax/scan engine 302 and on-screen document manager 310 are suitably provided with user access via user interface 106. Job queue 312 is suitably interfaced with raster image processor (RIP) and page description language (PDL) functionality 316, as well as job parser 318. Job parser 318 is suitably interfaced with client device services 322. Job queue 312 is suitably interfaced with network services 314, which in turn is interfaced with client network services 320.

Figure 4:
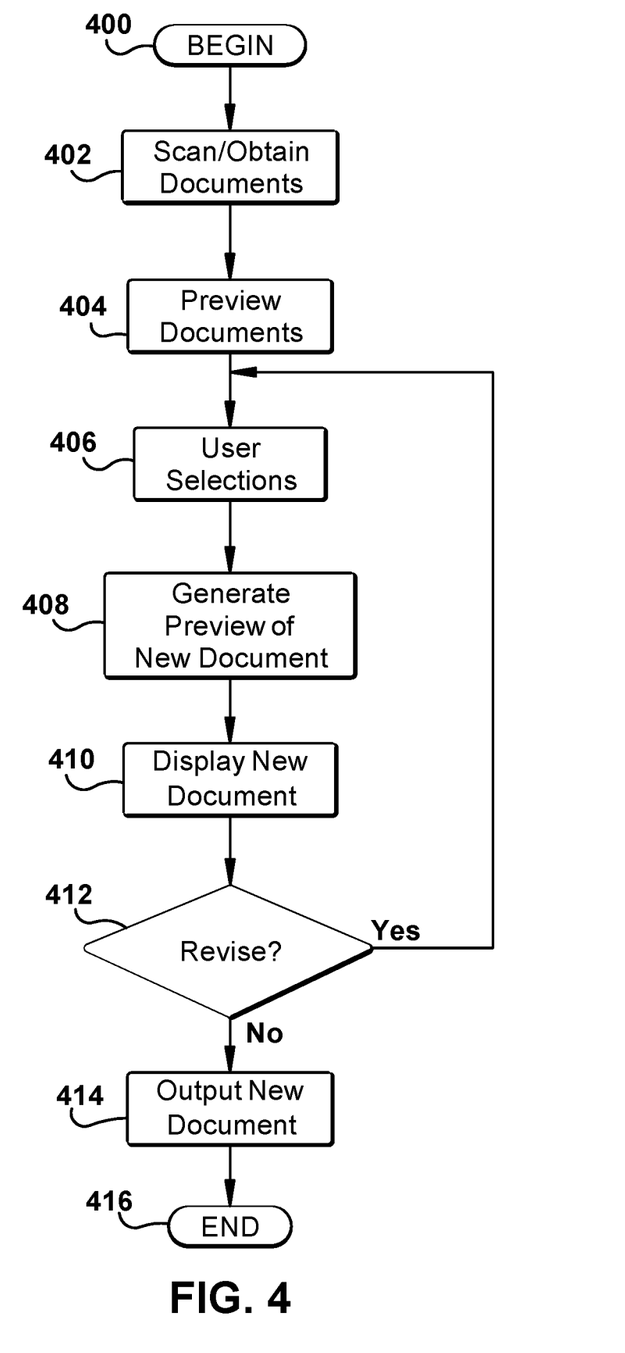
FIG. 4 is a flow diagram of example processes of an on-screen document management system according to an embodiment of the disclosure.

Referring now also to FIG. 4, example operations of the on-screen document management system 100 are presented. Processing starts at process block 400 labeled "START" and continues to process block 402.

In process block 402, a user scans one or more documents using an MFP. Each document can comprise one or more pages and include text, whitespace, and images. The documents can be in color or black and white. The documents can be scanned at the same resolution or in different resolutions. The documents can be any suitable page size and orientation. In an embodiment, one or more documents can be retrieved from another computing device or MFP 104, or received from another computing device, for example by email. Processing continues to process block 404.

In process block 404, the on-screen document management system 100 can optionally display one or more documents. The documents can be displayed in any suitable format, for example by showing a scanned document in a resolution appropriate for the display element of the user interface 106. In another example, a multi-page document can be shown as an image of stacked overlapping pages with the top page showing a page of the scanned document. Multiple scanned documents can also be displayed using multiple icons, multiple images, lists, or using other indicia as would be understood by one of ordinary skill in the art. The user interface 106 can be configured to allow the user of the MFP 104 to manipulate each scanned document or pages of documents as would be understood in the art. Processing continues to process block 406.

In process block 406, the user can make selections for on-screen management of scanned documents using the user interface 106 of the MFP 104. The user can view and manipulate documents prior to printing, faxing, or emailing them to other computers. In a first example, the user can select a portion of a scanned document, place it into a new document, and then resize the selected portion to the desired dimensions in the new document. Controls in the user interface 106 allow the user to select whether to retain proportions in the new document or resize the selected portion differently along the x-axis and y-axis. In a configuration, the user can select a frame in the new document. The frame can be the entire printable area of the new document, or the frame can be a selected area of the new document. The user can select all, or a portion of, the scanned document to be placed into the frame in the new document. In this configuration, the resizing can be performed automatically so as to best fit the selected portion into the frame. In various configurations the proportions of the selected area can be selected, by the user, to remain the same in the frame or to be resized to fit the frame, as would be understood by one of ordinary skill in the art. For example, if the proportions are to remain the same, then the user interface 106 can resize the selected area such that one axis of the selected area is the same size as the frame. If the other axis is shorter than the frame, then the selected area can be justified inside of the frame, for example left justified, right justified, centered, etc., and white space can be added to fill in the remaining area of the frame.

In a second example, the user can take a single page of a document and split it into two or more new documents. In this configuration, the user can manually determine where the split occurs, or the user can have the user interface 106 determine how to best split the page of the scanned document. In a configuration, the user interface 106 can split the document so as to avoid splitting lines of text or pictures.

In a third example, the user can select portions of multiple documents, or multiple portions of the same document, and merge them into a new document. For example, the user can define two or more frames in a new document and then select portions from the scanned document or documents that are placed within each of the frames in the new document. In this way, the user can create a new document from one or multiple scanned documents.

After each selected portion of the scanned document is placed into the new document, processing continues to process block 408.

In process block 408, the new document is rendered using the selected portions of the scanned documents and displayed to the user to review. In an embodiment, the user interface 106 or the embedded controller 108 of the MFP 104 processes the selected portion to be placed in the new document and renders a graphical image of the new document. The rendered document is then displayed in the user interface 106. The rendering is generally performed so as to display the rendered document in a suitable format that matches the display characteristics of the display screen of the user interface 106. In this way, the new document is rendered in a way that displays a suitable image for the user to view on the display screen. In a configuration, the rendered document is rendered into a format that matches the display resolution of the display screen of the user interface 106. In another embodiment, a separate server such as image processing server 114 of FIG. 1 is used to render the image of the new document for display on the user interface 106. In a configuration, the user interface 106 or embedded controller sends the scanned documents, data defining the selected areas of the scanned documents, and framing information of the new document to the image processing server 114 which renders the image of the new document for display by the user interface 106. Communications can be sent over a network, such as the network 102 of FIG. 1. In a configuration, the image processing server 114 can receive identifying indicia of the scanned documents and can obtain the scanned documents independently of the MFP, for example from a storage server. In a configuration, instead of receiving the scanned documents, the image processing server 114 can receive the selected areas from the scanned documents. In an embodiment, the image processing server 114 can be embedded in the MFP 104, or separate from the MFP 104. In an embodiment, one image processing system 114 can service a plurality of the MPFs 104. Processing continues to process block 410.

In process block 410, the user interface 106 displays the rendered new document. In a configuration, the user interface 106 or embedded controller 108 can generate a low resolution version of the new document that is replaced when the higher resolution version of the new documents once it is received from the image processing server 114. In this way, the user is able to manipulate, in real time, a lower resolution version of the new document which is then replaced with the higher resolution version of the new document as the higher resolution version becomes available. This can provide the user with an improved user experience. In a configuration, the low resolution version can be an icon, a suitable graphic, or a resized version of a previously rendered new document as would be understood in the art. Processing continues to decision block 412.

In decision block 412, if the user continues to revise the new documents, then processing returns to process block 406 where the user can perform on-screen functions for managing the scanned documents, otherwise processing continues to process block 414.

In process block 414, the user can output the new document. For example, the user can select to print the new document using the MFP 104. In another example, the user can select to fax the new document to a recipient. In yet another example, the user can send the new document to one or more email recipients, which can include the user. Other suitable functions of the MFP 104 can also be performed as would be understood by one of ordinary skill in the art. Processing terminates at end block 416 labeled, "END".

Referring now also to FIGS. 5A-5D, presented are example illustrations of the resizing, splitting, merging, and redacting on-screen document management functions of the user interface 500. A user can perform any suitable combination of on-screen document management functions with any suitable number of source and destination documents as would be understood in the art.

Figure 5A:
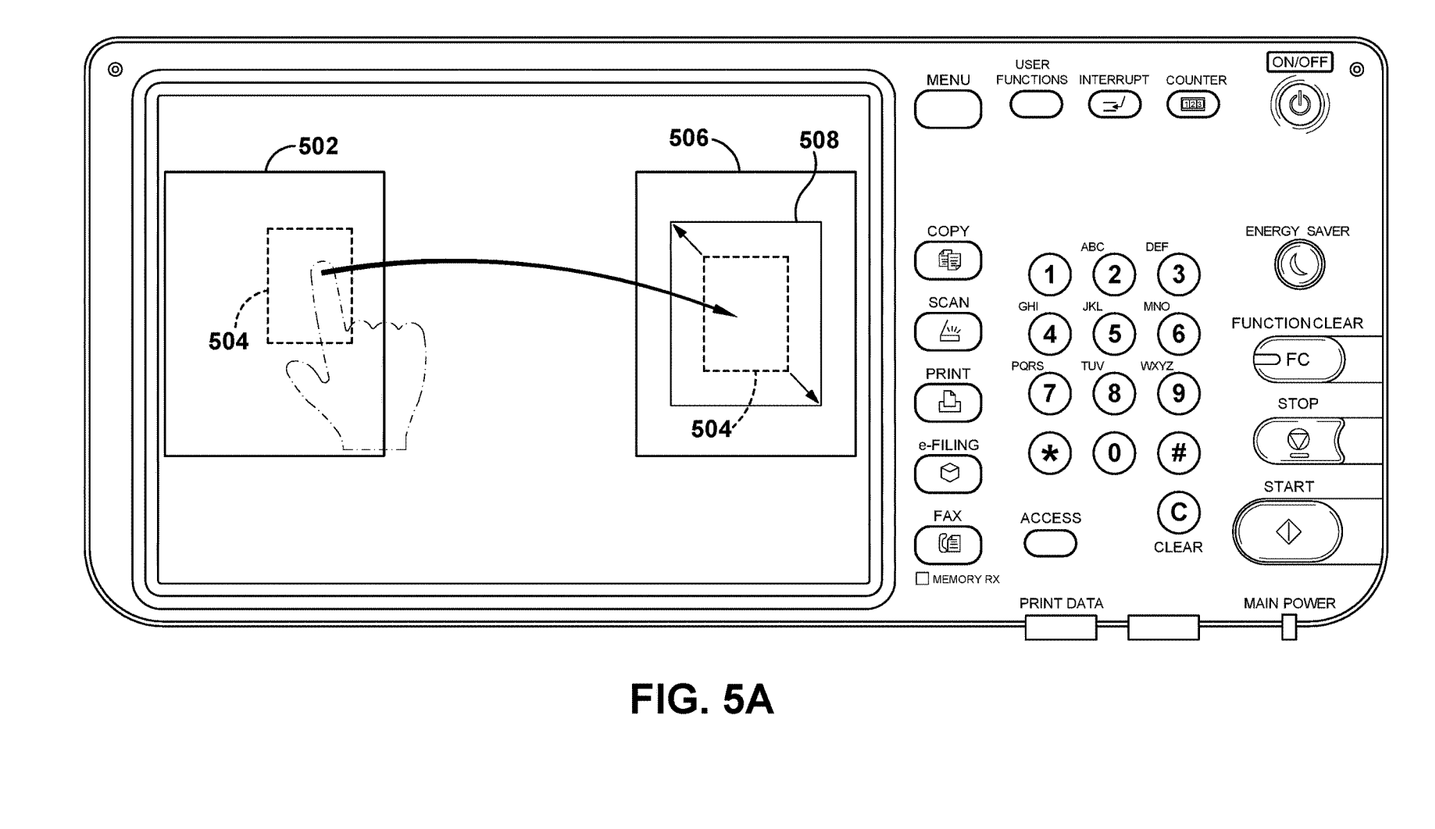
FIGS. 5A-5D are diagrams of example on-screen document management functions of an on-screen document management system according to an embodiment of the disclosure.

In FIG. 5A, a resizing operation is shown. A portion 504 of a scanned document 502 is selected by a user, for example by a selection touch command on the user interface 500. The user creates a frame 508 in the new document 506. The user drags the selected portion 504 to the frame 508. In a configuration, the selected portion 504 can be automatically resized to fit the frame as described above. In a configuration, the user can manually resize the selected portion 504 in the frame 508. In a configuration, the selected portion 504 can be the entire scanned document 502. In a configuration, the frame 508 can be the entire new document 506. In this configuration, if the paper size of the scanned document 502 is different from the paper size of the new document 506, then the resizing can be based upon the difference in paper sizes.

Figure 5B:
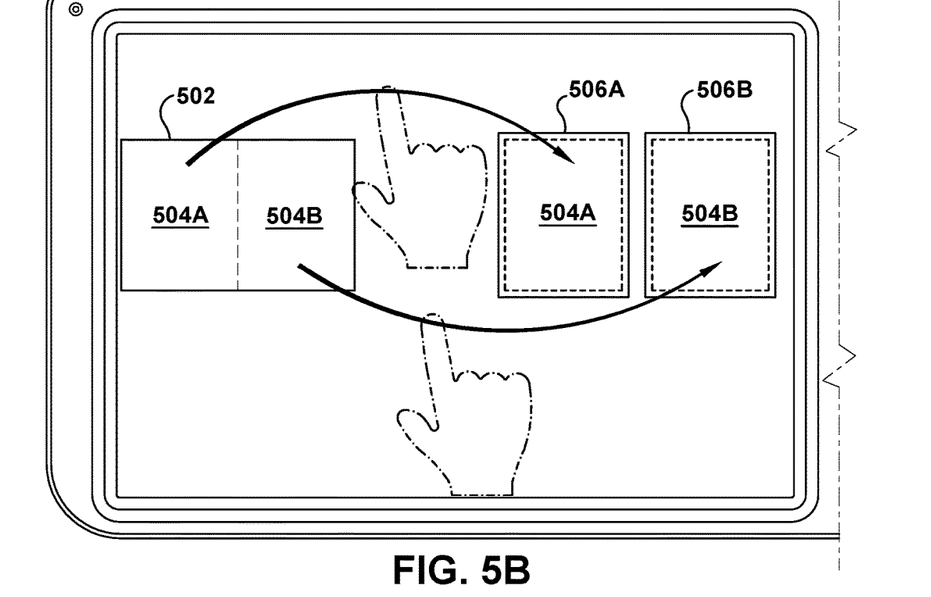

In FIG. 5B, a splitting operation is illustrated. A user selects a scanned document 502 and indicates that the scanned document 502 is to be split into multiple portions 504 such as portion 504A and portion 504B. The user drags one or more selected portions 504 to new document 506A and new document 506B. In a configuration, the split function can be selected by selecting multiple portions 504A, 504B. In a configuration, a control (not shown) can be used to select the split function and the portions 504A, 504B can be determined by the user interface 106. For example, common splitting operations include splitting a document into four quadrants where each quadrant becomes one of four new documents, or splitting a document into nine equal portions, or other common splitting operations as would be understood in the art. In a configuration, the new documents 506A, 506B can include a frame 508 such as that shown for FIG. 5A.

Figure 5C:
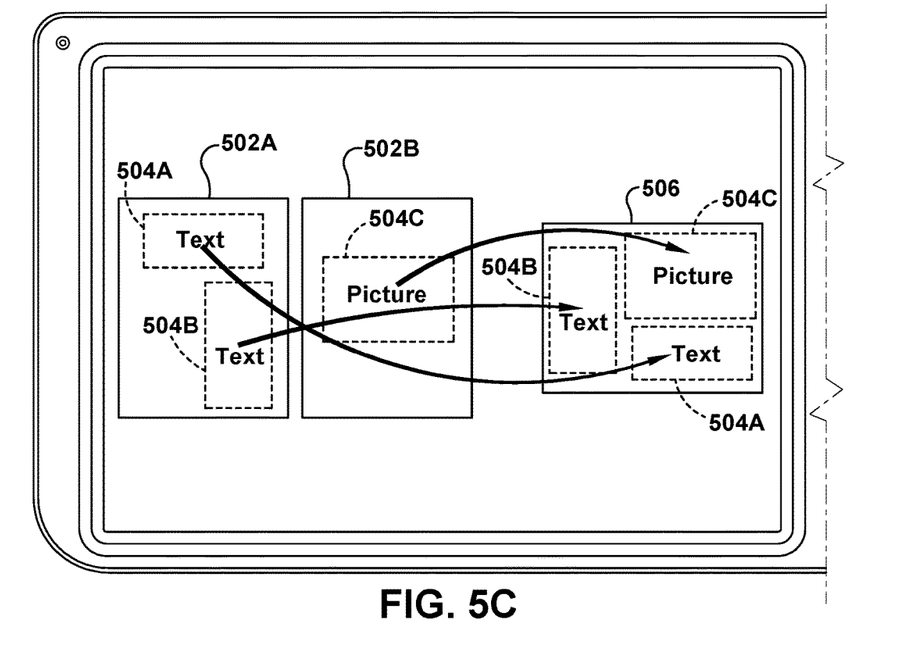

In FIG. 5C, a merge operation is illustrated. Although illustrated with three source and one destination documents, any suitable number of source and destination documents can be used as would be understood by one of ordinary skill in the art. A user creates frames 508 in the new document 506 such as frame 508A, frame 508B, and frame 508C (collectively frames 508). A user selects one or more source documents, such as scanned document 502A, scanned document 502B, and scanned document 502C (collectively scanned documents 502). The user drags the selected scanned document 502 to the desired framed 508. In a configuration, the user can select one or more portions 504 from one or more scanned documents 502 as described above and drag the selected portions 504 to the desired frames 508.

Figure 5D:
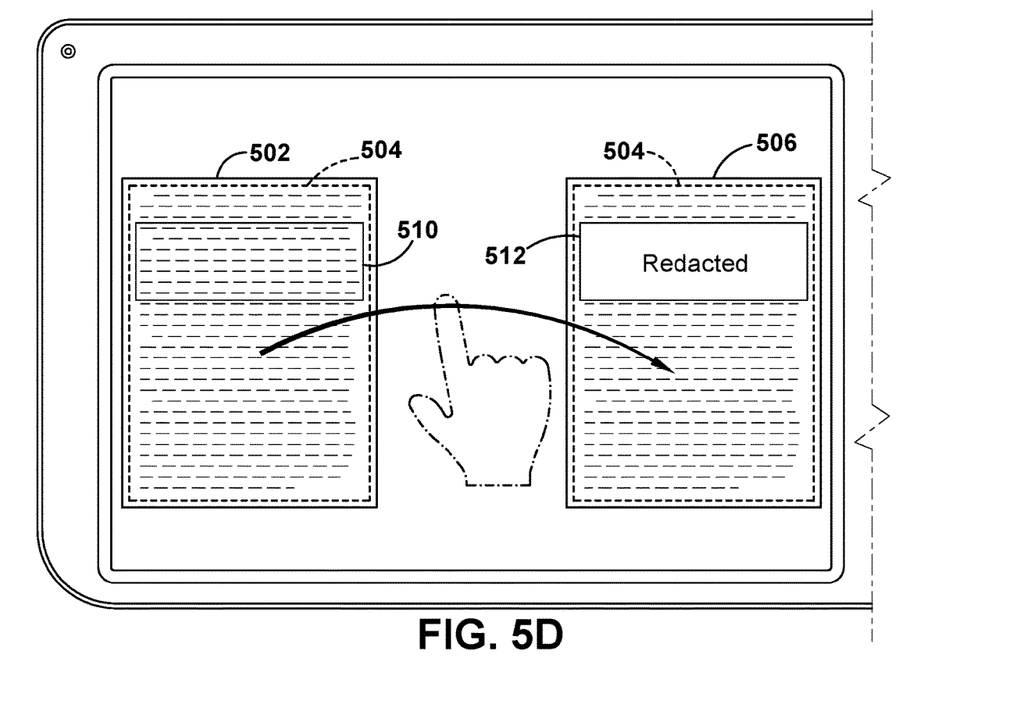

In FIG. 5D, a redacting operation is illustrated. A user selects a redaction selection 510 within the scanned document 502 to be redacted, for example by a selection touch command on the user interface 500. The user selects a selected portion 504 of the scanned document, which nominally includes all or part of the redaction selection 510, to be copied to the new document 506. The user drags the selected portion 504 to the new document 506 which can include a frame as described above. When copied to the new document 506, the redaction selection 510 is not copied to the new document 506. Instead, a user-selectable replacement, or redacted area 512, is provided in place of the redaction selection 510. In one configuration, the redacted area 512 can be white space or a white space that includes a border indicating the area being redacted. In another configuration, the redaction selection 510 can be removed and the areas above and below the redaction selection 510 can be concatenated together. In another configuration, the redacted area 512 can be replaced with a colored area, such as a black rectangle or shape. In another configuration, the redacted area 512 can be replaced with a suitable graphic, such as a box with text words such as "REDACTED". In a configuration, the selected portion 504 can be automatically or manually resized to fit the new document 506 or frame as described above. In a configuration, the selected portion 504 or the frame can be the entire document as described above.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the spirit and scope of the inventions.

What is claimed is:

1. A document processing device, comprising:
   an embedded controller including a processor, a memory in data communication with the processor, and a network interface in communication with the processor, the memory operable for storage of data and instructions, and the network interface configured for data communication via an associated network;
   a display in communication with the embedded controller;
   wherein, in response to user commands, the processor is configured to create a new document presented on the display,
   define a frame in the new document,
   select an entire page of an existing document as a selected portion,
   select a selection of pages of an existing document,
   select a subset of pages from an existing document,
   select a subset of a page from an existing document,
   select an area of a page from an existing documents,
   select an area of a page without a redacted portion from an existing document,
   select text from a page of an existing document,
   select a picture from a page of an existing document,
   position the selected portion into the frame of the new document comprised of an entire page of the new document,
   position the selected portion into the frame of the new document comprised of a subset of a page of the new document,
   position the selected portion into the frame of the new document comprised of a rectangular area within a page of the new document, and
   output the new document via a document processing operation.

2. The document processing device of claim 1, wherein the display includes touch capability, and wherein one or more of the user commands to define, to select, or to position is configured to be performed by one or more fingers of a user through touch commands on the display.

3. The document processing device of claim 1, wherein subsequent to positioning the selected portion into the frame of the new document, the processor is further configured to present, on the display, a rendered image of the new document that includes the selected portion, and
   wherein the rendered image of the new document is rendered by one or more of the processor or an image processing server in communication with the document processing device via the network interface.

4. The document processing device of claim 1, wherein the document processing operation is selected from the group consisting of printing, emailing, faxing, and storing external to the document processing device, and
   wherein the existing document is received via a second document processing operation selected from scanning, receiving via email, receiving via fax, and retrieving from storage external to the document processing device.

5. The document processing device of claim 1, wherein the frame in the new document has different dimensions than the selected portion, and
   wherein the processor is further configured to resize the selected portion to fit within the frame.

6. The document processing device of claim 1, wherein the frame in the new document is two or more pages of the new document, and wherein the selected portion of the existing document is split between the two or more pages of the new document.

7. The document processing device of claim 1, wherein, in response to user commands, the processor is further configured to
define a second frame in the new document,
select at least a second portion of the existing document or a second existing document as a second selected portion, and
position the second selected portion into the second frame of the new document.

8. The document processing device of claim 7, wherein, in response to user commands, the processor is further configured to
define a third frame in the new document,
select at least a third portion of the existing document as a third selected portion, and
position the third selected portion into the third frame of the new document.

9. A method, comprising:
selecting, on a display screen of a document processing device, at least a portion of an existing document as a selected portion;
positioning the selected portion of the existing document in a new document;
rendering an image of the new document that includes the selected portion;
displaying the rendered image on the display screen as the new document; and
outputting the new document via a document processing operation; and
wherein the display screen is a touch capable display screen configured to receive one or more touch commands from a user for performing an on-screen document management function for selectively
resizing at least a portion of an existing document as a new document,
redacting one or more portions from an existing document and generating a new document without the redacted portions,
splitting at least a portion of an existing document into multiple pages in a new document, and
merging a plurality of portions of one or more existing documents into a new document.

10. The method of claim 9, wherein the document processing operation for outputting the new document is selected from the group consisting of printing, emailing, faxing, and storing external to the document processing device, and
wherein the existing document is received via a second document processing operation selected from scanning, receiving via email, receiving via fax, and retrieving from storage external to the document processing device.

11. The method of claim 9, wherein the rendered image of the new document is rendered by one or more of the processor of the document processing device or an image processing server that is in communication with the document processing device via a network interface of the document processing device.

12. The method of claim 9, further comprising:
defining a user-selectable frame in the new document; and
resizing the selected portion to fit the user-selectable frame in the new document,
wherein the frame is selected from the group consisting of an entire page of the new document, a subset of a page of the new document, and a rectangular area within a page of the new document.

13. The method of claim 9, further comprising:
selecting at least a second portion of the existing document or a portion of a second existing document as a second selected portion;
positioning the second selected portion in the new document; and
rendering an image of the new document that includes the second selected portion.

14. A multifunction document processing device, comprising:
an embedded controller including a processor, a memory in data communication with the processor, and a network interface in communication with the processor, the memory operable for storage of data and instructions, and the network interface configured for data communication via an associated network; and
a touch capable display in communication with the embedded controller, wherein one or more of the touch capable display and the embedded control are configured to
receive, from a user, a touch command for selecting at least a portion of an existing document as a selection,
receive, from the user, a touch command to drag the selection to a new document,
display a rendered image of the new document that includes the selection, and
output the new document using a document processing operation; and
wherein one or more of the touch capable display or the embedded control are further configured to
receive a touch command of a user that defines a user-selectable frame in the new document,
resize the selected portion to fit the user-selectable frame in the new document,
select the frame as an entire page of the new document,
select the frame as a subset of a page of the new document,
select the frame as a selected area of a page without a redacted portion, and
select the frame as a rectangular area within a page of the new document.

15. A multifunction document processing device, comprising:
an embedded controller including a processor, a memory in data communication with the processor, and a network interface in communication with the processor, the memory operable for storage of data and instructions, and the network interface configured for data communication via an associated network; and
a touch capable display in communication with the embedded controller, wherein one or more of the touch capable display and the embedded control are configured to
receive, from a user, a touch command for selecting at least a portion of an existing document as a selection,
receive, from the user, a touch command to drag the selection to a new document,
display a rendered image of the new document that includes the selection, and
output the new document using a document processing operation; and
wherein one or more of the touch capable display or the embedded control are further configured to receive one or more touch commands from a user for resizing at least a portion of an existing document as a new document, redacting one or more portions from an existing document and generating a new document without the redacted portions, splitting at least a portion of an existing document into multiple pages in a new document, and merging a plurality of portions of one or more existing documents into a new document.

16. The multifunction document processing device of claim 15, wherein the rendered image of the new document is rendered by one or more of the processor of the document processing device or an image processing server that is in communication with the document processing device via a network interface of the document processing device.

17. The multifunction document processing device of claim 15, wherein the document processing operation is selected from the group consisting of printing, emailing, faxing, and storing external to the document processing device, and wherein each existing document is received via a second document processing operation selected from scanning, receiving via email, receiving via fax, and retrieving from storage external to the document processing device.

18. The multifunction document processing device of claim 14, wherein the rendered image of the new document is rendered by one or more of the processor of the document processing device or an image processing server that is in communication with the document processing device via a network interface of the document processing device.

19. The multifunction document processing device of claim 14, wherein the document processing operation is selected from the group consisting of printing, emailing, faxing, and storing external to the document processing device, and wherein each existing document is received via a second document processing operation selected from scanning, receiving via email, receiving via fax, and retrieving from storage external to the document processing device.

\* \* \* \* \*